US012621035B2

(12) United States Patent
Oteri et al.

(10) Patent No.: US 12,621,035 B2
(45) Date of Patent: May 5, 2026

(54) METHOD FOR BEAM SWITCHING IN MMWAVE SYSTEMS

(71) Applicant: Apple Inc., Cupertino, CA (US)

(72) Inventors: Oghenekome Oteri, San Diego, CA (US); Dawei Zhang, Saratoga, CA (US); Wei Zeng, Saratoga, CA (US); Chunxuan Ye, San Diego, CA (US); Haitong Sun, Cupertino, CA (US); Hong He, San Jose, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 19 days.

(21) Appl. No.: 17/440,710

(22) PCT Filed: Oct. 16, 2020

(86) PCT No.: PCT/CN2020/121488
§ 371 (c)(1),
(2) Date: Apr. 21, 2022

(87) PCT Pub. No.: WO2022/077438
PCT Pub. Date: Apr. 21, 2022

(65) Prior Publication Data
US 2025/0158695 A1 May 15, 2025

(51) Int. Cl.
*H04B 7/08* (2006.01)
*H04B 7/06* (2006.01)
(Continued)

(52) U.S. Cl.
CPC ......... *H04B 7/06952* (2023.05); *H04B 7/088* (2013.01); *H04L 27/26025* (2021.01); *H04L 27/2678* (2013.01); *H04W 72/0446* (2013.01)

(58) Field of Classification Search
CPC ........... H04W 72/0446; H04W 72/044; H04W 72/046; H04B 7/088; H04B 7/0868;
(Continued)

(56) References Cited

U.S. PATENT DOCUMENTS 10,979,265 B2    4/2021  Yi et al.
2019/0222289 A1  7/2019  John Wilson et al.
(Continued)

FOREIGN PATENT DOCUMENTS

CN    110115008 A    8/2019
CN    110536456 A    12/2019
(Continued)

OTHER PUBLICATIONS

International Preliminary Report on Patentability directed to related International Patent Application No. PCT/CN2020/121488, issued Apr. 27, 2023; 5 pages.
(Continued)

*Primary Examiner* — Phong La
(74) *Attorney, Agent, or Firm* — Sterne, Kessler, Goldstein & Fox P.L.L.C.

(57) ABSTRACT
Some embodiments include a system, method, and computer program product for managing beam switching at a higher subcarrier spacing (SCS) at millimeter wavelength (mmWave) frequencies in a 5G wireless communications system. A user equipment (UE) transmits a beam switching gap (BSG) capability to a 5G Node B (gNB). The UE receives a transmission configuration indicator (TCI) state from the gNB, and performs a beam switch to the TCI state corresponding to a first beam. The UE can receive a first control resource set (CORESET) on the first beam and a second CORESET on a second beam where the BSG occurs between the first CORESET and a second CORESET. The UE can perform beam switching within the BSG from the
(Continued)

first beam to a second beam, and receive the second CORE-SET on the second beam. The UE can determine and transmit modified candidate values of beam switching parameters to the gNB.

20 Claims, 9 Drawing Sheets

(51) Int. Cl.
*H04L 27/26* (2006.01)
*H04W 72/0446* (2023.01)

(58) Field of Classification Search
CPC ......... H04L 27/26025; H04L 27/26035; H04L 27/2602; H04L 27/2603; H04L 27/261; H04L 27/2678; H04L 27/2676
See application file for complete search history.

(56) References Cited

U.S. PATENT DOCUMENTS

| | | | | |
|---|---|---|---|---|
| 2019/0349915 | A1 | 11/2019 | Ahn et al. | |
| 2019/0356524 | A1 | 11/2019 | Yi et al. | |
| 2020/0267571 | A1 | 8/2020 | Park et al. | |
| 2021/0058113 | A1* | 2/2021 | Jung | H04W 72/23 |
| 2021/0083748 | A1 | 3/2021 | Guan et al. | |
| 2021/0112560 | A1* | 4/2021 | Khoshnevisan | H04L 5/0098 |
| 2021/0112561 | A1* | 4/2021 | Zhou | H04B 7/088 |
| 2021/0314021 | A1* | 10/2021 | Sakhnini | H04B 1/713 |
| 2021/0320699 | A1* | 10/2021 | Zhou | H04L 5/0048 |
| 2021/0321436 | A1* | 10/2021 | Nam | H04L 5/0051 |
| 2021/0337408 | A1* | 10/2021 | Nam | H04W 72/53 |
| 2022/0007248 | A1* | 1/2022 | Shrestha | H04W 24/08 |

FOREIGN PATENT DOCUMENTS

| | | | | |
|---|---|---|---|---|
| CN | 111095817 | A | 5/2020 | |
| CN | 111656839 | A | 9/2020 | |
| CN | 113840380 | A * 12/2021 | | H04B 7/0626 |
| CN | 114145063 | A * 3/2022 | | H04B 7/0695 |
| WO | WO 2018/106043 | A1 | 6/2018 | |
| WO | WO-2020234687 | A1 * 11/2020 | | H04L 5/0051 |
| WO | WO 2021/072336 | A1 | 4/2021 | |
| WO | WO-2021088035 | A1 * 5/2021 | | H04B 17/345 |

OTHER PUBLICATIONS

Extended European Search Report directed to related European Patent Application No. 20957216.3, mailed Jun. 4, 2024; 10 pages.

Office Action and Search Report directed to related Chinese Patent Application No. 202080106260.0, mailed Jun. 27, 2024, with attached English-language translation; 12 pages.

Intel Corporation, "Miscellaneous corrections for UE capabilities," 3GPP Draft, R2-1810970, Jul. 16, 2018; 20 pages.

Nokia, "Required changes to NR using existing DL/UL NR waveform," 3GPP TSG RAN WG1 #101-e, R1-2003811, May 16, 2020; 21 pages.

Intel Corporation, "Discussion on Required Changes to NR in 52.6-71 Ghz," 3GPP TSG RAN WG1 Meeting #102-e, R1-2005886, Aug. 8, 2020; 24 pages.

International Search Report and Written Opinion of the International Searching Authority directed to related International Patent Application No. PCT/CN2020/121488, mailed Jul. 15, 2021; 8 pages.

3GPP, "Summary on [101-e-NR-TEIs-03]," R1-2004831, Jun. 5, 2020, accessed at https://www.3gpp.org/ftp/TSG_RAN/WG1_RL1/TSGR1_101-e/Docs/?sortby-namerev.

3GPP, "Discussion summary #5 of [102-e-NR-52-71-Waveform-Changes]," R1-2007364, Aug. 28, 2020, accessed at https://www.3gpp.org/DynaReport/TDocExMtg--R1-102-e--38708.htm.

Chinese Office Action directed to Chinese Patent Application No. 202080106260.0, mailed Feb. 28, 2025; 16 pages.

Office Action for Chinese Application No. 202080106260.0, mailed Jul. 3, 2025, 06 Pages.

Intel Corporation et al., R2-2008638, Release-16 UE capabilities based on RAN1, RAN4 feature lists and RAN2 corrections, 3GPP TSG RAN WG2 #111-E (3GPP server publication date: Sep. 8, 2020). 100 pages.

Office Action for Korean Application No. 10-2023-7016409, mailed Jun. 10, 2025, 11 pages.

* cited by examiner

300

CORESET
325

CORESET
330

CP310a

CP310b

315a

315b

340

CP350a

CORESET
355

CP350b

CORESET
360

345a

345b

370

CP380a

CORESET
373

CORESET
375

BSG 390a

Beam Switching Gap
(BSG) 390b

385

CP380b

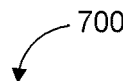
700

<38.213 v15.7 -Table 11.1.1-1: Slot formats for normal cyclic prefix>
D : Downlink, U : Uplink, F : Flexible

| Format | Symbol Number in a slot | | | | | | | | | | | | | |
|---|---|---|---|---|---|---|---|---|---|---|---|---|---|---|
|  | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |

⋮

| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | D | F | F | U | U | U | U | U | U |
| 46 | D | D | D | D | D | F | U | D | D | D | D | D | F | U |
| 47 | D | D | F | U | U | U | U | D | D | F | U | U | U | U |
| 48 | D | F | U | U | U | U | U | D | F | U | U | U | U | U |
| 49 | D | D | D | D | F | F | U | D | D | D | D | F | F | U |
| 50 | D | D | F | F | U | U | U | D | D | F | F | U | U | U |
| 51 | D | F | F | U | U | U | U | D | F | F | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | f | D | D | D | D | D | D | D |
| 55 | D | D | F | F | F | U | U | U | D | D | D | D | D | D |
| 62-254 | Reserved | | | | | | | | | | | | | |
| 255 | UE determines the slot format for the slot based on tdd-UL-DL-ConfigurationCommon, or tdd-ULDL-ConfigurationDedicated and, if any, on detected DCI formats | | | | | | | | | | | | | |

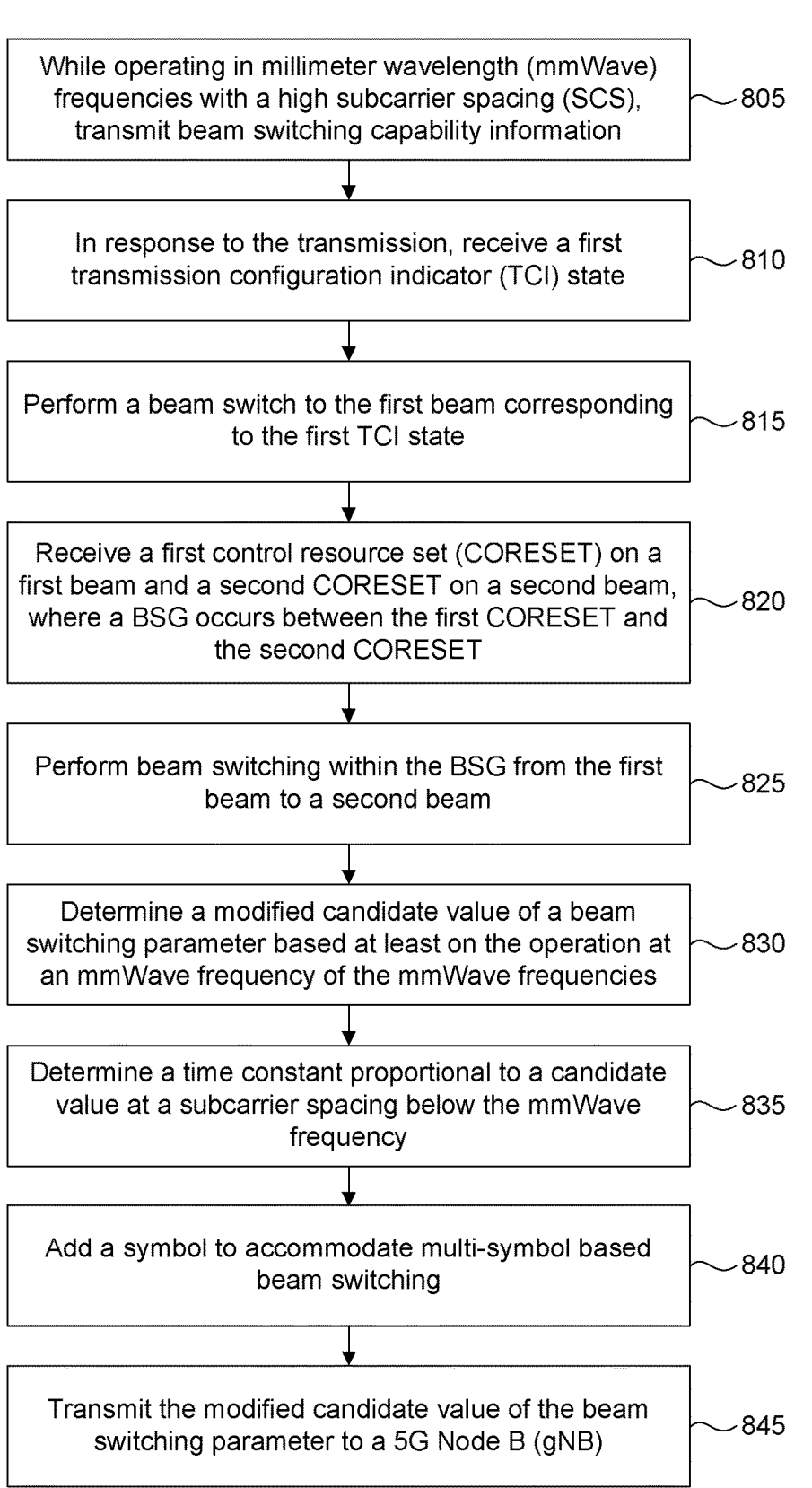

800

While operating in millimeter wavelength (mmWave) frequencies with a high subcarrier spacing (SCS), transmit beam switching capability information — 805

In response to the transmission, receive a first transmission configuration indicator (TCI) state — 810

Perform a beam switch to the first beam corresponding to the first TCI state — 815

Receive a first control resource set (CORESET) on a first beam and a second CORESET on a second beam, where a BSG occurs between the first CORESET and the second CORESET — 820

Perform beam switching within the BSG from the first beam to a second beam — 825

Determine a modified candidate value of a beam switching parameter based at least on the operation at an mmWave frequency of the mmWave frequencies — 830

Determine a time constant proportional to a candidate value at a subcarrier spacing below the mmWave frequency — 835

Add a symbol to accommodate multi-symbol based beam switching — 840

Transmit the modified candidate value of the beam switching parameter to a 5G Node B (gNB) — 845

FIG. 8

Computer System 900

METHOD FOR BEAM SWITCHING IN MMWAVE SYSTEMS

This application is a U.S. National Phase of International Application No. PCT/CN2020/121488, filed Oct. 16, 2020, which is hereby incorporated by reference in its entirety.

BACKGROUND

Field

The described embodiments relate generally to 5G wireless communications.

Related Art 5G wireless communications systems include user equipment (UE) communicating with a 5G node B (gNB) using beam switching.

SUMMARY 5G systems that operate with high subcarrier spacing (SCS) in millimeter wavelength (mmWave) frequencies can be mmWave systems. 5G systems operating below mmWave frequencies can perform cyclic prefix (CP)-level beam switching during a CP of a symbol. In mmWave systems, the length of a CP is reduced and may be shorter than the time needed for an mmWave system to perform a beam switch. Thus, after a beam switch, the mmWave system may not receive critical information resulting in poor performance and negative user experience.

Some embodiments include a system, method, and computer program product, and/or combination(s) or sub-combination(s) thereof, for beam switching in mmWave systems. Some embodiments include a user equipment (UE) that can operate in mmWave frequencies. The UE transmits a beam switching gap (BSG) capability to a 5G Node B (gNB). In response to the transmission, the UE receives a first transmission configuration indicator (TCI) state and the UE performs a beam switch to the first beam corresponding to the first TCI state. The UE receives from the gNB a first control resource set (CORESET) on the first beam and a second CORESET on a second beam, where the BSG occurs between the first CORESET and a second CORESET. The UE performs beam switching within the BSG from the first beam to a second beam, and receives the second CORESET on the second beam. The time to perform the beam switching within the BSG is greater than a length of a cyclic prefix (CP) of a symbol of the first CORESET, and/or the BSG is greater than the time needed by the UE to perform the beam switching. Further, the UE may not transmit or receive signals during the BSG.

In some embodiments the UE determines a modified candidate value of a beam switching parameter based at least on the operation at an mmWave frequency of the mmWave frequencies, and transmits the modified candidate value of the beam switching parameter to the gNB. The beam switching parameter is associated with: beam switching, Aperiodic-Channel State Information-Reference Signal (A-CSI-RS) beam switching timing, Physical Downlink Shared Channel (PDSCH) beam switching, beam reporting timing, more than one Downlink (DL)/Uplink (UL) switch point in a slot, or a CSI computation delay requirement. The beam switching parameter can be associated with Physical Uplink Shared Channel (PUSCH) beam switching.

The modified candidate value includes additional symbols to accommodate a smaller symbol duration of the mmWave frequency, or symbol-level beam switching. To determine the modified candidate value, the UE can determine a time constant proportional to a candidate value at a subcarrier spacing below the mm Wave frequency. In some embodiments the UE can add one or more symbols to accommodate symbol-level beam switching. The modified candidate value can be a function of the time constant proportional to the candidate value at the subcarrier spacing below the mmWave frequency. In some embodiments the beam switching parameter is maxNumberRxTxBeamSwitchDL, and the determined modified candidate value includes: a maximum of one receive (Rx) transmit (Tx) switch per slot of the first CORESET; a single Rx Tx switch over multiple slots of the first CORESET; or a minimum number of symbols within a slot of the first CORESET before a Rx Tx switch. In some embodiments the beam switching parameter comprises tdd-MultiDL-UL-SwitchPerSlot, and the determined modified candidate value includes: more than one switch point within X slots, where X is an integer, and wherein a minimum number of symbols occur between a switch point of the more than one switch point. In some embodiments, to support the determined modified candidate value of the tdd-MultiDL-UL-SwitchPerSlot, a slot format indicator pattern comprises a flexible symbol between an uplink symbol and a downlink symbol.

In some embodiments the mmWave system is a gNB operating mmWave frequencies. The gNB can receive a BSG capability corresponding to a UE, and in response, transmit a first TCI state for the UE to receive a first beam. The gNB transmits a first CORESET on the first beam and a second CORESET on the second beam, where the BSG occurs between the first CORESET and a second CORESET, and where the first CORESET identifies a second TCI state for the UE to receive a second beam.

BRIEF DESCRIPTION OF THE FIGURES

The accompanying drawings, which are incorporated herein and form part of the specification, illustrate the presented disclosure and, together with the description, further serve to explain the principles of the disclosure and enable a person of skill in the relevant art(s) to make and use the disclosure.

FIG. 7 illustrates a slot format indicator table example in an mmWave system, according to some embodiments of the disclosure.

FIG. 8 illustrates a method for symbol-level beam switching in an mmWave system, according to some embodiments of the disclosure.

Figure 1:
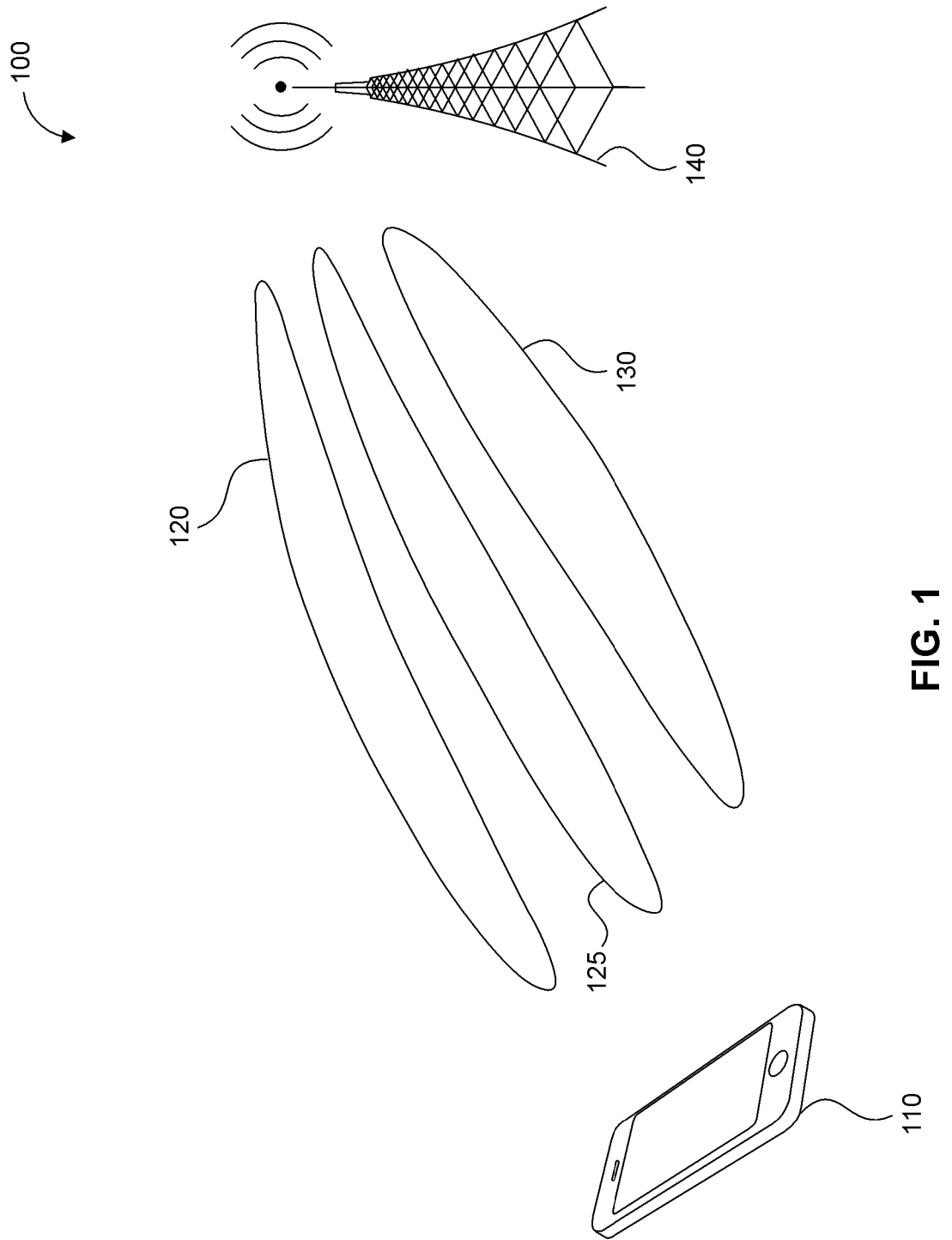
FIG. 1 illustrates an example of beam switching in a millimeter wavelength (mmWave) system, in accordance with some embodiments of the disclosure.

The presented disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

A 5G wireless communications system can include a user equipment (UE) that communicates with a 5G Node B (gNB). The UE can perform beam switching such as switching from antenna associated with a first beam to a second antenna associated with a second beam on the same or different antenna panel. Implementing cyclic-prefix (CP)-level beam switching is possible at a subcarrier spacing (SCS) where the CP of a symbol is of sufficient duration. The beam switching can occur within the CP of the symbol. However, with higher SCS in millimeter mm wavelength (mmWave) frequencies, the CP may be too short to support beam switching. Some embodiments include a system, method, and computer program product for beam switching in mmWave systems.

FIG. 1 illustrates example 100 of beam switching in an mmWave system, in accordance with some embodiments of the disclosure. System 100 includes UE 110 that communicates with gNB 140 using 5G wireless communications via beams 120, 125, and/or 130. Examples of the 5G wireless communications can include but is not limited to 5G communications as defined by 3$^{rd}$ Generation Partnership Project (3GPP) standards. For example, UE 110 can include an electronic device configured to operate using a 3GPP release, such as Release 17 (Rel-17), or other present/future 3GPP standards. For example, gNB 140 can transmit a first control resource set (CORESET) that includes a first Physical Downlink Control Channel (PDCCH) signal that may be repeated multiple times via different beams 120, 125, and/or 130 for each repetition (e.g., beam cycling). The gNB 140 can transmit a different CORESET on different beams 120, 125, and/or 130. UE 110 can perform beam switching to receive the above CORESETs. In some examples UE 110 may receive one or more CORESETs with corresponding PDCCH from multiple transmission-receive points (TRPs) and/or gNBs (not shown) including gNB 140. UE 110 may need to switch beams between each TRP and/or gNB to receive each CORESET.

Figure 2:
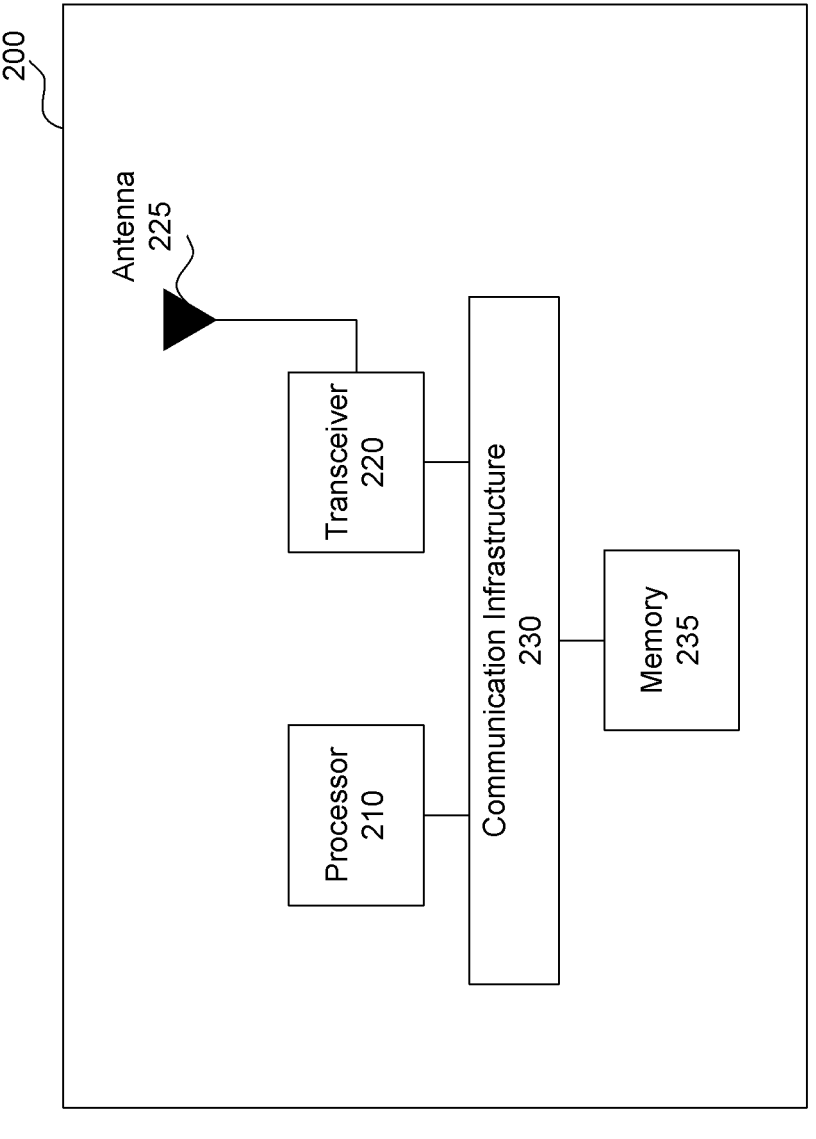
FIG. 2 illustrates a block diagram of an example mmWave system supporting beam switching, according to some embodiments of the disclosure.

FIG. 2 illustrates a block diagram of an example mmWave system supporting beam switching, according to some embodiments of the disclosure. As a convenience and not a limitation, system 200, may be described with elements of FIG. 1. System 200 can be UE 110 or gNB 140. UE 110 may be a computing electronic device such as a smart phone, cellular phone, and for simplicity purposes—may include other computing devices including but not limited to laptops, desktops, tablets, personal assistants, routers, monitors, televisions, printers, and appliances. System 200 includes processor 210, transceiver 220, communication infrastructure 230, memory 235, and antenna 225 that together perform operations for mmWave system beam switching. Transceiver 220 transmits and receives 5G wireless communications signals via antenna 225. Antenna 225 may include one or more antennas or antenna panels that may be the same or different types to enable wireless communication over a wireless network. Communication infrastructure 230 may be a bus. Memory 235 may include random access memory (RAM) and/or cache, and may include control logic (e.g., computer software), computer instructions, and/or data. Processer 210, upon execution of the computer instructions, can be configured to perform the functionality described herein for mmWave system beam switching. In some embodiments, processor 210 can include its own internal memory (not shown), and/or be "hard-wired" (as in a state-machine) configured to enable mm Wave system beam switching described herein.

In 5G systems, the SCS affects a duration of a symbol and thus affects a cyclic prefix (CP) duration, payload duration, and overhead as shown below in Table 1. Subcarrier Spacing and Symbol Duration shown below, where the symbol duration and CP duration decreases as the subcarrier spacing increases. Values for 240 kHz, 480 kHz, and 960 kHz are example values.

TABLE 1

| Subcarrier Spacing and Symbol Duration | | | | |
| --- | --- | --- | --- | --- |
| | Remaining Symbols | | | |
| SCS (KHz) | CP Duration (usec) | Payload Duration | Overhead | Symbol Duration |
| 15 | 4.668 | 66.67 | 0.07 | 71.354 |
| 30 | 2.334 | 33.33 | 0.07 | 35.677 |
| 60 | 1.167 | 16.67 | 0.07 | 17.839 |
| 120 | 0.583 | 8.33 | 0.07 | 8.919 |
| 240 | 0.292 | 4.17 | 0.07 | 4.460 |
| 480 | 0.146 | 2.08 | 0.07 | 2.226 |
| 960 | 0.073 | 1.04 | 0.07 | 1.113 |

UE 110 can perform beam switching to change the beams used to receive and transmit signals (e.g., by switching from one antenna using a first beam to a second antenna on the same or a different active antenna panel using a second beam.) Beam switching time is the amount of time UE 110 takes to perform beam switching, and the beam switching time is specific to the type of device. Thus, beam switching time does not change with a different SCS. Beam switching is typically CP-level based and is performed during a CP duration for operations of SCS below mm Wave frequencies (e.g., 120 kHz). But, as the CP duration decreases with higher SCS values, the CP duration may not be sufficient to allow UE 110 to properly perform beam switching.

Figures 3A, 3B, 3C:
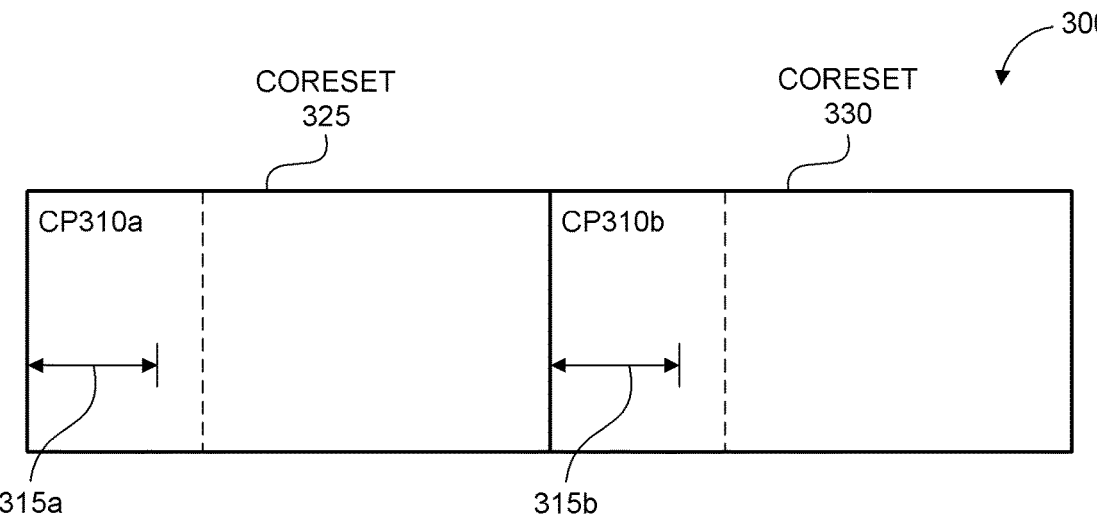
FIG. 3A illustrates a cyclic prefix (CP)-level beam switching example, according to some embodiments of the disclosure.
FIG. 3B illustrates an insufficient CP-level beam switching example in an mmWave system, according to some embodiments of the disclosure.
FIG. 3C illustrates a beam switching gap (BSG) example of beam switching in an mmWave system, according to some embodiments of the disclosure.

FIG. 3A illustrates CP-level beam switching example 300, according to some embodiments of the disclosure. Example 300 may pertain to SCS of 240 kHz where CP duration=292 nsec. Example 300 includes CORESETs 325 and 330 that include corresponding cyclic prefix (CP) 310a and 310b. The vertical axis for CORESETs 325 and 330 are subcarrier frequencies and the horizontal axis is time measured in symbols of slots. The time duration of CORESET 325 and 330 can extend over one or more symbols. The time needed for a UE in example 300 to switch from a first beam to a second beam is shown as beam switching time 315a and 315b. Note that beam switching times 315a and 315b are shorter than CP 310a or CP 310b. Thus, the UE can decode CORESET 325 and switch from a first beam to a second beam during the sufficient time length of CP 310*a*, in time to receive CORESET 330 on the second beam. But when operating at higher subcarrier spacing (SCS) at mmWave frequencies, the length of time for a CP may be too short to perform beam switching as demonstrated in FIG. 3B.

FIG. 3B illustrates insufficient CP-level beam switching example 340 of beam switching in an mmWave system, according to some embodiments of the disclosure. As a convenience and not a limitation, FIG. 3B may be described with elements of previous figures. Example 340 may pertain to SCS of 480 kHz (or higher) where the CP duration is 146 nsec or less. Example 340 includes CORESETs 355 and 360 that include corresponding cyclic prefix (CP) 350*a* and 350*b*. The vertical axis for CORESETs 355 and 360 are subcarrier frequencies and the horizontal axis is time measured in symbols of slots. The time duration of CORESETs 355 and 360 can extend over one or more symbols. Because of the higher SCS in the mmWave frequencies, the duration of CORESETs 355 and 360 and corresponding cyclic prefix (CP) 350*a* and 350*b* are shorter than CORESETs 325 and 330 and corresponding CP 310*a* and CP 310*b*. The time needed for UE 110 of FIG. 1 in example 340 to switch from a first beam to a second beam is shown as beam switching time 345*a* and 345*b*. Note that beam switching times 345*a* and 345*b* are longer than CP 350*a* or CP 350*b*. Thus, UE 110 can decode CORESET 355 but UE 110 cannot perform a beam switch from a first beam to a second beam during the insufficient time length of CP 350*a*, in time to receive CORESET 360 on the second beam. Thus, when operating at higher SCS at mmWave frequencies, CP-level beam switching may not work (e.g., the length of time for a CP may be too short to perform beam switching) as demonstrated in example 340.

FIG. 3C illustrates beam switching gap (BSG) example 370 of beam switching in an mmWave system, according to some embodiments of the disclosure. As a convenience and not a limitation, FIG. 3C may be described with elements of previous figures. Example 370 may pertain to SCS of 480 kHz (or higher) where the CP duration is 146 nsec or less. Example 370 includes CORESETs 373 and 375 that include corresponding CP 380*a* and 380*b*. The vertical axis for CORESETs 373 and 375 are subcarrier frequencies and the horizontal axis is time measured in symbols of slots. The time duration of CORESETs 373 and 375 can extend over one or more symbols. Because of the higher SCS in the mm Wave frequencies, the duration of CORESETs 373 and 375 and corresponding cyclic prefix (CP) 380*a* and 380*b* are shorter than respective CORESETs 325 and 330 and corresponding CP 310*a* and CP 310*b*. The time needed for UE 110 of FIG. 1 in example 370 to switch from a first beam to a second beam is shown as beam switching time 385. Note that beam switching times 315*a*, 315*b*, 345*a*, 345*b*, and 385 are substantially the same as the amount of time UE 110 needs to physically switch from one antenna to another. Beam switching time is based on a type of UE 110 and does not change with SCS values. Beam switching time 385 is longer than CP 380*a* or CP 380*b*. Like example 340, UE 110 can decode CORESET 373 but UE 110 cannot perform a beam switch from a first beam to a second beam during the insufficient time length of CP 380*a*, in time to receive CORESET 375 on the second beam.

To address the insufficient time length of CP 380*a*, some embodiments include a beam switching gap (BSG) with a time length of one or more symbols during which a UE can perform beam switching. In example 370, BSG 390*a* and 390*b* are shown. For example, UE 110 can decode CORE- SET 373 and UE 110 can perform a beam switch from a first beam to a second beam during BSG 390*b*, in time to receive CORESET 375 on the second beam. The configuration of BSGs is described in FIG. 4 below.

Figure 4:
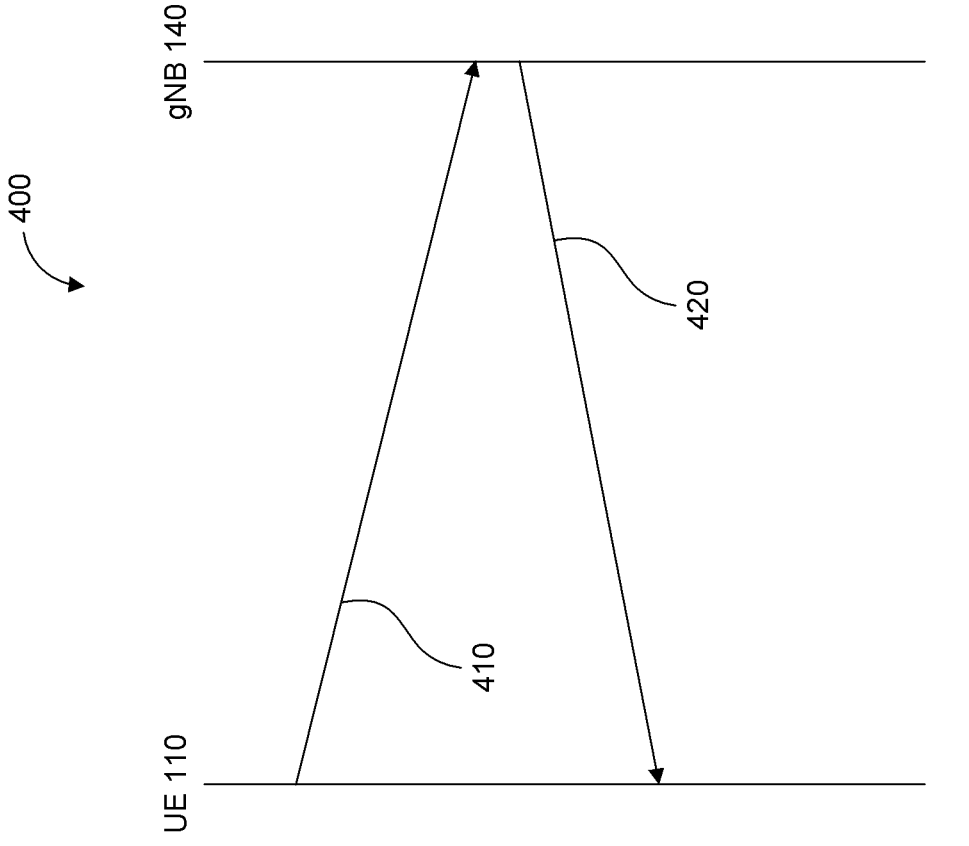
FIG. 4 illustrates a configuration example for beam switching in an mmWave system, according to some embodiments of the disclosure.

FIG. 4 illustrates configuration example 400 for beam switching in an mmWave system, according to some embodiments of the disclosure. As a convenience and not a limitation, FIG. 4 may be described with elements of previous figures. Example 400 includes UE 110 and gNB 140 of FIG. 1. In some embodiments UE 110 can be implemented by system 200 of FIG. 2.

At 410, UE 110 can transmit beam switching capability information in a signal to gNB 140 via beam 120 of FIG. 1. When UE 110 is operating with a higher SCS at mmWave frequencies, the beam switching capability information includes: i) an indication that a BSG is needed; ii) a specific modified candidate value or a group of modified candidate values pertaining to one or more beam switching parameters associated with transmission: Aperiodic-Channel State Information-Reference Signal (A-CSI-RS) beam switching timing, Physical Downlink Shared Channel (PDSCH) beam switching, Physical Uplink Shared Channel (PUSCH) beam switching, beam reporting timing, and/or a CSI computation delay requirement; and/or iii) rules for receive (Rx) Transmit (Tx) beam changes (e.g., switch points in a slot) pertaining to the following capabilities: beam switching and/or more than one Downlink (DL)/Uplink (UL) switch point in a slot.

Subsequent to receiving UE 110's beam switching capability information, gNB 140 configures CORESETs for UE 110 with appropriate spacing. In some examples, UE 110 indicates that symbol-based beam switching is sufficient and a BSG is not needed (e.g., UE 110 is operating with a SCS below mmWave frequencies.) In some embodiments, UE 110's beam switching capability information indicates a BSG is needed. The gNB 140 configures a single transmission configuration indicator (TCI) state (e.g., identifying a corresponding beam) per CORESET where the CORESET is configured with a BSG if a TCI state change is needed. In some embodiments, gNB 140 configures multiple TCI states per CORESET with multiple instances of the CORESET configured with a BSG between each CORESET instance. When the beam switching capability information includes a specific modified candidate value or a group of modified candidate values pertaining to one or more beam switching parameters, gNB 140 configures the BSG time length to accommodate the one or more modified candidate values. When the beam switching capabilities information includes rules for receive (Rx) Transmit (Tx) beam switching, gNB 140 selects an appropriate slot format indicator or slot format that satisfies the rules.

At 420, gNB 140 transmits corresponding beam switching configuration information to UE 110 (e.g., via beam 120) where the corresponding beam switching configuration information accommodates the beam switching capabilities of UE 110 received (e.g., according to items i), ii), and iii).)

UE Beam Switching Capability Information Indicates a BSG is Needed

In some examples UE 110 transmits to gNB 140, an amount of time that UE 110 needs to switch from one beam to another. In some examples the SCS are associated with an index and the UE 110 indicates to gNB 140 that at or above a certain index, a BSG is needed. For example, for SCS of 120 kHz, 240 kHz, 480 kHz, and 960 kHz there are corresponding index numbers 1, 2, 3, and 4. UE 110 can indicate to gNB 140 that for index number 3 or greater than 3 (where SCS=480 kHz) UE 110 needs a BSG. In some examples, gNB 140 indicates a SCS of 960 kHz (e.g., index 4). In response to receiving the SCS value or index from gNB 140, UE 110 transmits an indication to gNB 140 whether a BSG is needed.

When UE 110 is operating with a higher SCS at mmWave frequencies, and the beam switching capability information includes an indication that a BSG is needed, the corresponding configuration information from gNB 140 indicates the TCI states that UE 110 uses to determine on which beams a CORESET will be received and the corresponding BSGs during which UE 110 can perform the beam switching.

For example, UE 110 can receive the corresponding configuration information from gNB 140 (e.g., via beam 120.) The corresponding configuration information can indicate a first TCI state corresponding to beam 125 and BSG 390*a*. UE 110 can perform beam switching (e.g., physically change from using a first antenna on a panel to a second antenna on the panel). In this example, UE 110 can switch from beam 120 to beam 125 corresponding to the first TCI state during BSG 390*a*, and then receive CORESET 373 on beam 125. In some examples, the corresponding configuration information from gNB 140 also includes a second TCI state corresponding to beam 130 and BSG 390*b*. In some embodiments CORESET 373 includes a second TCI state corresponding to beam 130 and BSG 390*b*. After UE 110 decodes CORESET 373, UE 110 performs beam switching from beam 125 to beam 130 corresponding to the second TCI state during BSG 390*b*. Given that beam switching time 385 is satisfied during BSG 390*b*, UE 110 can subsequently receive CORESET 375 from gNB 140 via beam 130.

In some embodiments for intra-band Carrier Aggregation (CA), UE 110 would not transmit or receive signals across all Carrier Components (CCs) during a BSG. For inter-band CA, UE 110 can report a capability to indicate whether UE 110 can transmit or receive signals across all CCs during a BSG.

UE Beam Switching Capability Information Indicates One or More Modified Candidate Values

When UE 110 is operating with a higher SCS at mmWave frequencies UE 110 can determine a specific modified candidate value or a group of modified candidate values pertaining to one or more beam switching parameters that are included in the beam switching capability information transmitted to gNB 140 at 410 of FIG. 4. The candidate values are modified to include additional slots and/or symbols to accommodate the smaller symbol duration and/or symbol-level beam switching (e.g., symbols are explicitly dedicated to account for beam switching.)

Figure 5:
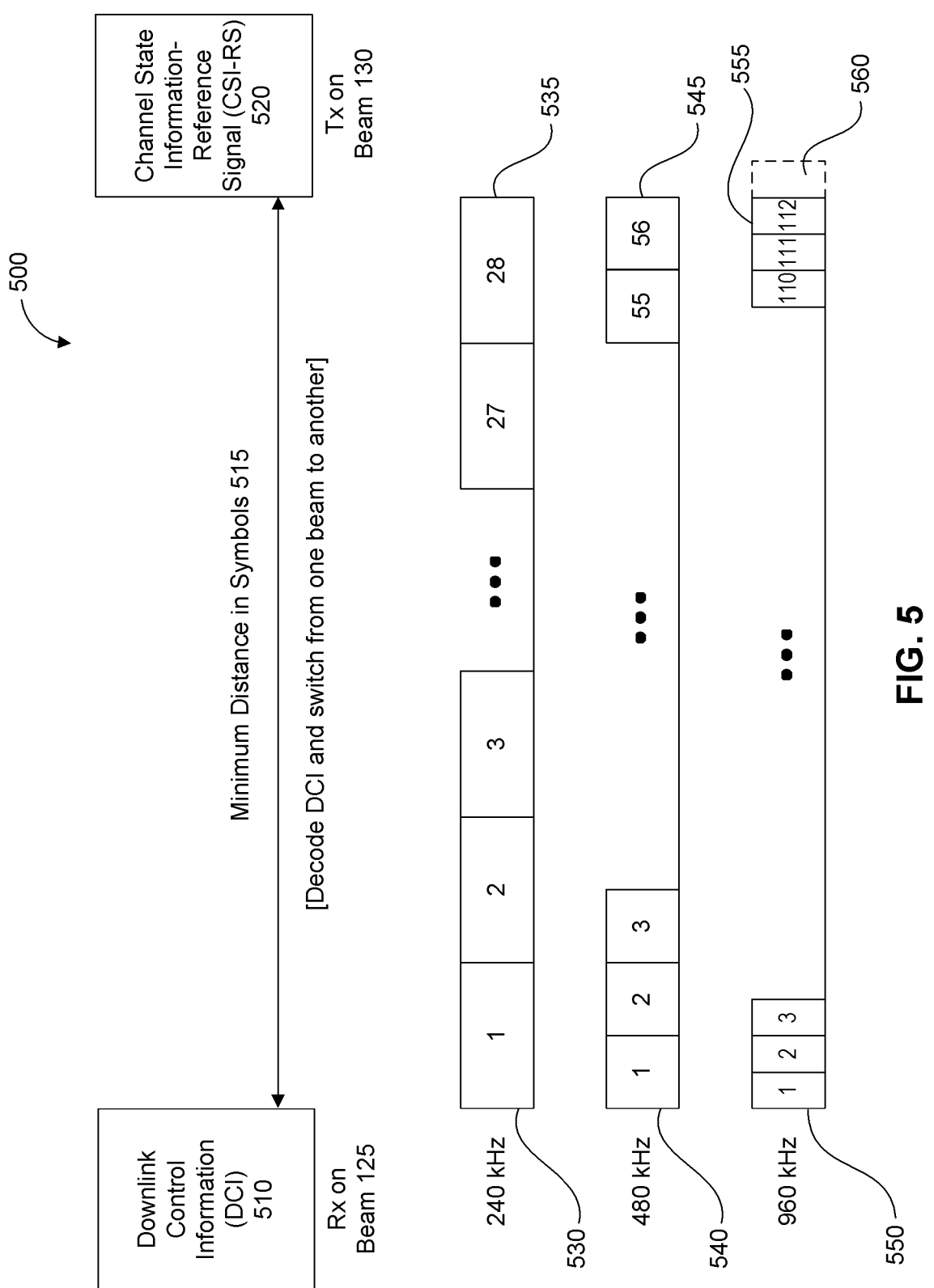
FIG. 5 illustrates an example of Aperiodic-Channel State Information-Reference Signal (A-CSI-RS) beam switching timing in an mmWave system, according to some embodiments of the disclosure.

FIG. 5 illustrates an Aperiodic-Channel State Information-Reference Signal (A-CSI-RS) beam switching timing example 500 in an mmWave system, according to some embodiments of the disclosure. As a convenience and not a limitation, FIG. 5 may be described with elements of previous figures. Example 500 can be performed by UE 110 of FIG. 1 or system 200 of FIG. 2. The A-CSI-RS beam switching timing capability corresponds to the beamSwitchTiming parameter that indicates the minimum number of orthogonal frequency-division multiplexing (OFDM) symbols between the Downlink Control Information (DCI) triggering of A-CSI-RS and A-CSI-RS transmission. The number of OFDM symbols is measured from the last symbol containing the indication to the first symbol of CSI-RS. UE 110 includes this field for each supported SCS. Example 500, illustrates reception on beam 125 of DCI 510, minimum distance in symbols 515 that corresponds to the beamSwitchTiming parameter, and CSI-RS 520 transmitted on beam 130. During minimum distance in symbols 515, UE 110 decodes DCI 510 and performs beam switching from beam 125 to beam 130.

Three SCS examples illustrate candidate values at SCS of 240 kHz, 480 kHz, and 960 kHz that can be used to satisfy minimum distance in symbols 515. The symbol duration decreases at higher SCS, while the amount of time UE 110 needs to perform beam switching (e.g., beam switching time 385 of FIG. 3C) remains fixed based on the type of device of UE 110. As shown in Table 1. Subcarrier Spacing and Symbol Duration, the corresponding CP durations may be too short compared to beam switching time 385. Referring to FIG. 5, at SCS of 240 kHz, a candidate value is 28 symbols long. At SCS of 480 kHz a candidate value is 56 symbols long, and at SCS of 960 kHz a candidate value is 112 symbols long. At higher SCS values the time for a symbol is reduced. For example, symbol 550 at SCS 960*k* is ½ the length of symbol 540 at 480 kHz and ¼ the length of symbol 530 at 240 kHz. Similarly, symbol 555 at SCS 960*k* is ½ the length of symbol 545 at 480 kHz and ¼ the length of symbol 535 at 240 kHz. The reduction in symbol time reduces the corresponding CP durations. To address the insufficient CP duration, UE 110 determines one or more modified candidate values for parameters like beamSwitchTiming parameter. In some embodiments UE 110 determines that minimum distance in symbols 515 is not sufficient and compensates for symbol-level beam switching by modifying the candidate value to include one or more symbols such as symbol 560. In example 500, the modified candidate value may be 113 symbols instead of 112 symbols.

UE 110 can determine modified candidate values for beam switching capabilities and corresponding parameters as shown below in Table 2. UE Capabilities Modified to Support SCS at mm Wave Frequencies. The capabilities and parameters are modified to incorporate both the symbol duration reduction and symbol-level beam switching (e.g., symbols are explicitly dedicated to account for beam switching.)

TABLE 2

| UE Capabilities Modified to Support SCS at mmWave Frequencies | |
|---|---|
| Beam Switching Capabilities | Parameters |
| A-CSI-RS beam switching timing | beamSwitchTiming |
| PDSCH beam switching | timeDurationForQCL |
| PUSCH beam switching | timeDurationForQCL_PUSCH |
| Beam reporting timing | beamReportTiming |
| CSI Computation Delay Requirement (Z, Z') | Z, Z' |

In some embodiments, the PUSCH beam switching capability can be defined as a time duration for determining and applying special Quasi co-location (QCL) information for corresponding PUSCH reception. The time duration can be defined counting from the end of a last symbol of PUCCH to the beginning of the first symbol of PUSCH.

To determine modified candidate values for the parameters corresponding to beam switching capabilities supporting SCS at mmWave frequencies, UE 110 can perform the following: a) modify a value to keep the time constant compared to a candidate value at a SCS below mmWave frequencies (e.g., at 60 kHz or 120 kHz); b) modify a value to keep the time constant compared to a candidate value at a SCS below mmWave frequencies and add one or more symbols and/or slots to accommodate for symbol-level beam switching; and/or c) modify a value to reduce the time compared to a candidate value at a SCS below mm Wave frequencies (e.g., due to improvements in hardware performance.) These are discussed further below.

In some embodiments, UE 110 can determine a modified candidate value by keeping a time constant compared to a candidate value at a SCS below mmWave frequencies (e.g., at 60 kHz or 120 kHz). In other words, UE 110 can proportionally modify a candidate value at a SCS below mmWave frequencies to determine a modified candidate value for operation at a SCS at mmWave frequencies. The operation can be determined by Equation 1 based on example candidate values at 120 kHz. Other example candidate values at SCS below mmWave frequencies are possible.

$$Value_{SCS} = \frac{SCS}{120 \text{ kHz}} \cdot Value_{120} \qquad \text{Equation 1}$$

Exemplary candidate values for beamSwitchTiming parameter are shown below in Table 3. Exemplary Candidate Values for A-CS-RSI Capability.

TABLE 3

| | Exemplary Candidate Values for A-CS-RSI Capability | | | | |
|---|---|---|---|---|---|
| SCS | candidate 1 | candidate 2 | candidate 3 | candidate 4 | candidate 5 |
| 120 kHz | 14 | 28 | 48 | 224 | 336 |
| 240 kHz | 28 | 56 | 96 | 448 | 672 |
| 480 kHz | 56 | 112 | 192 | 896 | 1344 |
| 960 kHz | 112 | 224 | 384 | 1792 | 2688 |

Using Equation 1 and candidate 1 at SCS 120 kHz as shown in Table 3. Exemplary Candidate Values for A-CS-RSI Capability, the A-CS-RSI beam switching timing capability of example 500 with 120 kHz, the modified candidate value is determined as follows:

$Value_{SCS@480kHz}$=(480 kHz/120 kHz)·14 symbols=56 symbols as shown by symbol 545 of FIG. 5.

Some examples of exemplary candidate values are shown below in Table 4. Exemplary Candidate Values for PDSCH Beam Switching and Table 5. Exemplary Candidate Values for Beam Reporting Timing that can be determined using Equation 1.

TABLE 4

| | Exemplary Candidate Values for PDSCH Beam Switching | |
|---|---|---|
| SCS | candidate 1 | candidate 2 |
| 120 kHz | 14 | 28 |
| 240 kHz | 28 | 56 |
| 480 kHz | 56 | 112 |
| 960 kHz | 112 | 224 |

TABLE 5

| | Exemplary Candidate Values for Beam Reporting Timing | | |
|---|---|---|---|
| SCS | candidate 1 | candidate 2 | candidate 3 |
| 120 kHz | 14 | 28 | 56 |
| 240 kHz | 28 | 56 | 112 |
| 480 kHz | 56 | 112 | 224 |
| 960 kHz | 112 | 224 | 448 |

In some embodiments, UE 110 can determine a modified candidate value by to keeping a time constant compared to a candidate value at a SCS below mmWave frequencies and adding one or more symbols and/or slots to accommodate for symbol-level beam switching. For example, in addition to Equation 1, UE 110 can add one or more symbols and/or slots to accommodate for symbol-level beam switching (e.g., see symbol 560 of example 500). The modified candidate value can be determined by Equation 2 shown below:

$$Value_{SCS} = \frac{SCS}{120 \text{ kHz}} \cdot Value_{120} + multiSymbolBeamSwitchCompensation \qquad \text{Equation 2}$$

Using Equation 2 and candidate 1 at SCS 120 kHz as shown in Table 3. Exemplary Candidate Values for A-CS-RSI Capability, the A-CS-RSI beam switching timing capability of example 500 with 120 kHz, the modified candidate value is determined as follows:

$Value_{SCS@960kHz}$=(960 kHz/120 kHz)·14 symbols+1 symbol equals 112 symbols as shown by symbol 555 plus the additional symbol 560. Thus the total symbol time equals 113 symbols. Using Equation 2 another table of exemplary candidate values can be determined. While the above example utilizes SCS at 120 kHz, other SCS values and corresponding candidate values are possible.

In some embodiments UE 110 can modify a value to reduce the time compared to a candidate value at a SCS below mmWave frequencies (e.g., due to improvements in hardware performance) as shown below in Equation 3.

$$Value_{SCS} = f\left(\frac{SCS}{120 \text{ kHz}} \cdot Value_{120}\right) + multiSymbolBeamSwitchCompensation \qquad \text{Equation 3}$$

For example, Equation 3 illustrates that a modified candidate value for a mmWave system can be determined as a function of the proportionally modified a candidate value at a SCS below mmWave frequencies demonstrated as 120 kHz, but is not limited to 120 kHz. Other SCS values and corresponding candidate value are possible. For example, hardware performance improvements may reduce the time constant by 70%. The corresponding modified candidate value can be determined by applying Equation 3:

$$Value_{SCS@960kHz} = (0.7) \cdot (960 \text{ kHz}/120 \text{ kHz}) \cdot 14 \text{ symbols} + 1 \text{ symbol}$$
$$= 79 \text{ symbols} + 1 \text{ symbol}$$
$$= 80 \text{ symbols}$$

In some embodiments the first portion of Equation 3 is sufficient and 79 symbols is used as the modified candidate value. Other percentages and mathematical functions are possible.

UE Beam Switching Capability Information Indicates Rx Tx Rules

When UE 110 is operating with a higher SCS at mm Wave frequencies and the beam switching capability information includes rules for receive (Rx) Transmit (Tx) switch points within a slot, gNB 140 configures slot formats to satisfy UE 110's capabilities. Some beam switch point capabilities and parameters are shown below in Table 6. Rx Tx Rules for Beam Switching for SCS at mmWave Frequencies.

TABLE 6

| Rx Tx Rules for Beam Switching for SCS at mmWave Frequencies | |
| --- | --- |
| Beam Switching Capabilities | Parameters |
| Beam switching More than one DL/UL switch point in a slot | maxNumberRxTxBeamSwitchDL tdd-MultiDL-UL-SwitchPerSlot |

Figure 6:
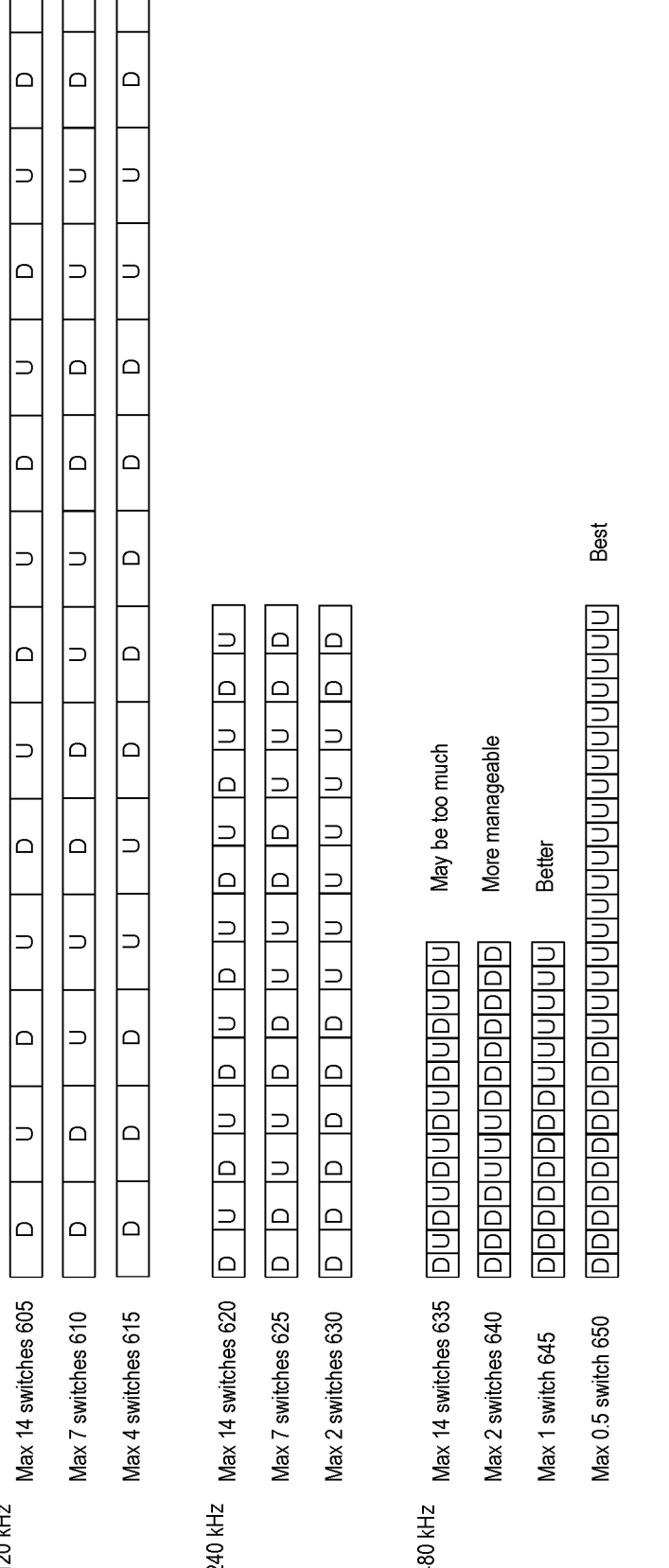
FIG. 6 illustrates a receive (Rx)-transmit (Tx) beam switching example in an mmWave system, according to some embodiments of the disclosure.

FIG. 6 illustrates receive (Rx)-transmit (Tx) beam switching example 600 in an mmWave system, according to some embodiments of the disclosure. As a convenience and not a limitation, FIG. 6 may be described with elements of previous figures. Example 600 can be performed by UE 110 of FIG. 1 or system 200 of FIG. 2. Example 600 illustrates SCS at 120 kHz with beam change capabilities with maxNumberRxTxBeamSwitchDL candidate values that include a maximum of 4, 7, or 14 Rx Tx beam switches as shown by max 4 switches 615, max 7 switches 610, and max 14 switches 605. SCS at 240 kHz for max 14 switches 620 and max 7 switches 625 are shown as well. SCS at 480 kHz for max 14 switches 635 may be too much for UE 110 to perform. In other words, UE 110 may not be able to perform beam switching quickly enough to receive or transmit signals, resulting in poor performance and/or negative user experiences.

With the increase in SCS in mmWave frequencies, some embodiments include limitations in the number of switch points from Rx to Tx (e.g., DL to UL) or Tx to Rx (UL to DL) to provide enough time (e.g., symbols) for UE 110 to change. Some embodiments include the following: a maximum of 1 or 2 switches per slot; a single switch over multiple slots (e.g., a maximum of 0.5 switches per slot or 1 switch per 2 slots; or a minimum number of symbols before a Rx or Tx beam switch is possible.)

For example, a maximum of 2 switches per slot is demonstrated in max 2 switches 630 at SCS 240 kHz. Max 2 switches 640 at the higher SCS of 480 kHz are more manageable. At SCS at 480 kHz max 1 switch 645 is better for UE 110 to perform given the reduced symbol size at the higher SCS in the mmWave frequencies. As shown in example 600, a single switch over multiple slots demonstrated by max 0.5 switch 650 indicates that is only one switch per 2 slots which allows UE 110 enough time to perform a beam switch.

For more than one DL/UL switch point in a slot capability, when there is no beam correspondence, tdd-MultiDL-UL-SwitchPerSlot can be configured to account for symbol-level beam switching as beam switching may not be possible within a CP. For example, tdd-MultiDL-UL-SwitchPerSlot can be configured to support more than one switch point within X slots and/or with a minimum number of symbols between switches. X is an integer that can be configured.

FIG. 7 illustrates slot format indicator table example 700 in an mmWave system, according to some embodiments of the disclosure. As a convenience and not a limitation, FIG. 7 may be described with elements of previous figures. In some embodiments a Slot Format Indicator (SFI) pattern can be modified to account for symbol-level beam switching. For example, selection 710 indicates slot formats 46-53 that switches from UL (U) to DL (D) without any gaps. Some embodiments include adding a flexible symbol between the U and D of selection 710 to support beam switching for wwWave systems operating with higher SCS. In some embodiments UE 110 utilizes one or more slot formats of selection 710 to communicate with gNB 140.

FIG. 8 illustrates method 800 for symbol-level beam switching in an mm Wave system, according to some embodiments of the disclosure. As a convenience and not a limitation, FIG. 8 may be described with elements of previous figures. For example, method 800 can be performed by UE 110 of FIG. 1 or system 200 of FIG. 2.

At 805, while operating in mmWave frequencies with a high SCS, system 200 transmits beam switching capability information that can include for example, a BSG capability to gNB 140.

At 810, in response to the transmission, system 200 receives a first TCI state that system 200 uses to determine the first beam.

At 815, system 200 performs a beam switch to the first beam corresponding to the first TCI state.

At 820, system 200 receives a first CORESET on a first beam and a second CORESET on a second beam, where a BSG occurs between the first CORESET and the second CORESET.

At 825, system 200 performs beam switching within the BSG from the first beam to the second beam. The beam switch time duration that occurs within the BSG is greater than a length of a CP of a symbol of the first CORESET, and/or the BSG is greater than the beam switch time duration.

At 830, system 200 determines a modified candidate value of a beam switching parameter based at least on the operation at an mmWave frequency of the mmWave frequencies. The beam switching parameter can be associated with: beam switching, Aperiodic-Channel State Information-Reference Signal (A-CSI-RS) beam switching timing, Physical Downlink Shared Channel (PDSCH) beam switching, Physical Uplink Shared Channel (PUSCH) beam switching, beam reporting timing, more than one Downlink (DL)/Uplink (UL) switch point in a slot, or a CSI computation delay requirement.

At 835, system 200 determines a time constant proportional to a candidate value at a subcarrier spacing below the mm Wave frequency.

At 840, system 200 adds a symbol to accommodate symbol-level beam switching At 845, system 200 transmits the modified candidate value of the beam switching parameter to a gNB.

Figure 9:
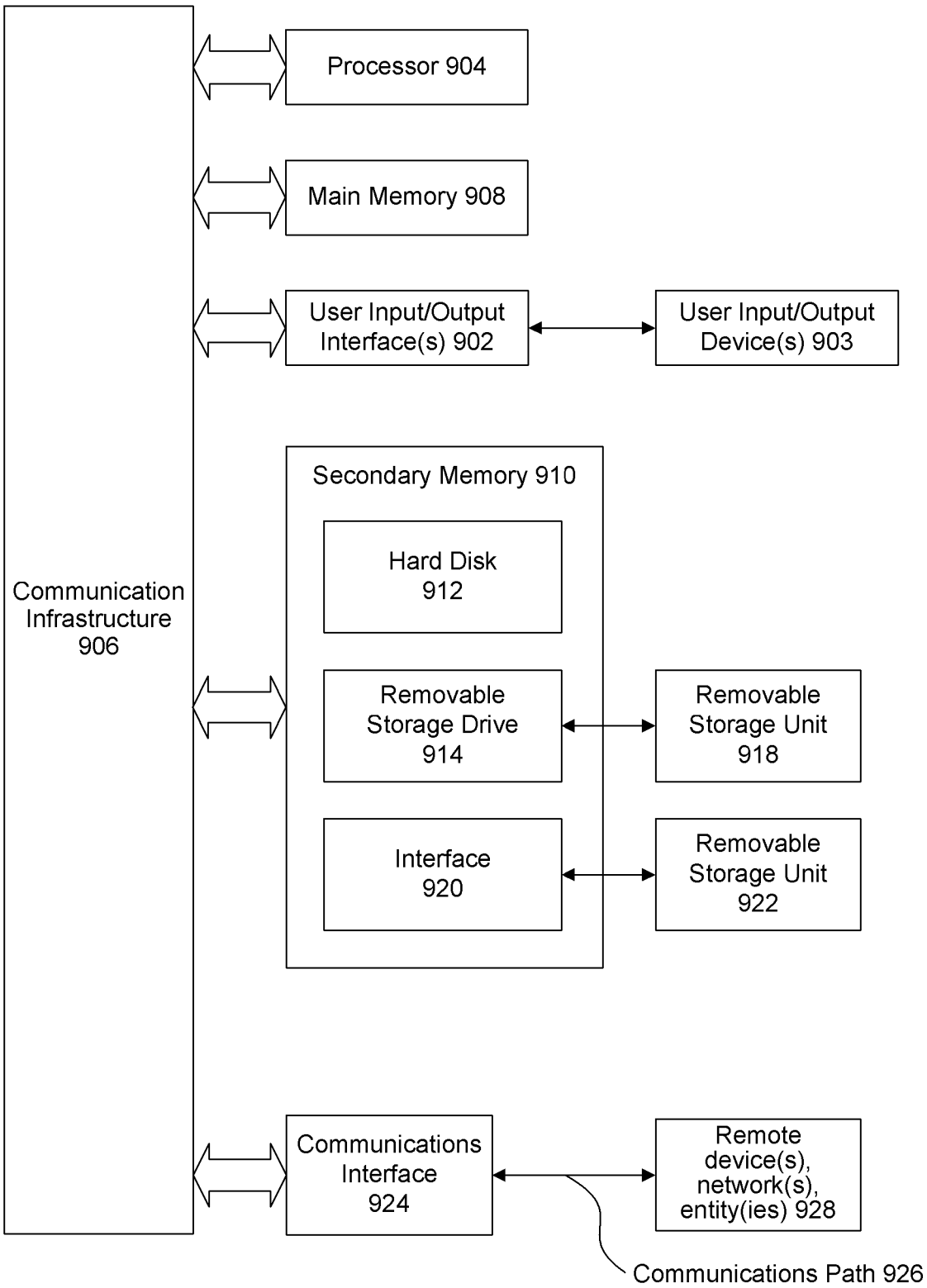
FIG. 9 is an example computer system for implementing some embodiments or portion(s) thereof.

Various embodiments can be implemented, for example, using one or more well-known computer systems, such as computer system 900 shown in FIG. 9. Computer system 900 can be any well-known computer capable of performing the functions described herein. For example, and without limitation, UE 110 and gNB 140 of FIGS. 1 and 4; system 200 of FIG. 2; examples 300, 340, and 370 of FIGS. 3A, 3B, and 3C; examples 500, 600, and 700 of corresponding FIGS. 5-7, method 800 of FIG. 8 (and/or other apparatuses and/or components shown in the figures) may be implemented using computer system 900, or portions thereof.

Computer system 900 includes one or more processors (also called central processing units, or CPUs), such as a processor 904. Processor 904 is connected to a communication infrastructure or bus 906. One or more processors 904 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 900 also includes user input/output device(s) 903, such as monitors, keyboards, pointing devices, etc., that communicate with communication infrastructure 906 through user input/output interface(s) 902. Computer system 900 also includes a main or primary memory 908, such as random access memory (RAM). Main memory 908 may include one or more levels of cache. Main memory 908 has stored therein control logic (e.g., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 includes a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 reads from and/or writes to removable storage unit 918 in a well-known manner.

According to some embodiments, secondary memory 910 may include other means, instrumentalities or other approaches for allowing computer programs and/or other instructions and/or data to be accessed by computer system 900. Such means, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 enables computer system 900 to communicate and interact with any combination of remote devices, remote networks, remote entities, etc. (individually and collectively referenced by reference number 928). For example, communication interface 924 may allow computer system 900 to communicate with remote devices 928 over communications path 926, which may be wired and/or wireless, and which may include any combination of LANs, WANs, the Internet, etc. Control logic and/or data may be transmitted to and from computer system 900 via communication path 926.

The operations in the preceding embodiments can be implemented in a wide variety of configurations and architectures. Therefore, some or all of the operations in the preceding embodiments may be performed in hardware, in software or both. In some embodiments, a tangible, non-transitory apparatus or article of manufacture includes a tangible, non-transitory computer useable or readable medium having control logic (software) stored thereon is also referred to herein as a computer program product or program storage device. This includes, but is not limited to, computer system 900, main memory 908, secondary memory 910 and removable storage units 918 and 922, as well as tangible articles of manufacture embodying any combination of the foregoing. Such control logic, when executed by one or more data processing devices (such as computer system 900), causes such data processing devices to operate as described herein.

Based on the teachings contained in this disclosure, it will be apparent to persons skilled in the relevant art(s) how to make and use embodiments of the disclosure using data processing devices, computer systems and/or computer architectures other than that shown in FIG. 9. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative embodiments may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

As described above, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. A user equipment (UE) system comprising:
a transceiver configured to perform wireless communications at millimeter wavelength (mmWave) frequencies; and
a processor coupled to the transceiver, configured to:
determine a modified candidate value of a beam switching parameter based at least on operation at an mmWave frequency of the mmWave frequencies;
transmit, via the transceiver, the modified candidate value of the beam switching parameter to a base station (BS);
receive via the transceiver, a first control resource set (CORESET) on a first beam and a second CORESET on a second beam, wherein a beam switching gap (BSG) occurs between the first CORESET and the second CORESET; and
perform beam switching within the BSG from the first beam to the second beam based at least on the beam switching parameter.

2. The UE system of claim 1, wherein a time to perform the beam switching within the BSG is greater than a length of a cyclic prefix (CP) of a symbol of the first CORESET.

3. The UE system of claim 1, wherein the processor is further configured to:
transmit, via the transceiver, a BSG capability;
in response to the transmission, receive via the transceiver, a first transmission configuration indicator (TCI) state; and
perform a beam switch to the first beam corresponding to the first TCI state.

4. The UE system of claim 1, wherein the beam switching parameter is associated with a capability including: Aperiodic-Channel State Information-Reference Signal (A-CSI-RS) beam switching timing, Physical Downlink Shared Channel (PDSCH) beam switching, beam reporting timing, a CSI computation delay requirement, beam switching, or more than one Downlink (DL)/Uplink (UL) switch point in a slot.

5. The UE system of claim 1, wherein the beam switching parameter is associated with Physical Uplink Shared Channel (PUSCH) beam switching.

6. The UE system of claim 1, wherein the modified candidate value includes additional symbols to accommodate a smaller symbol duration of the mmWave frequency, or symbol-level beam switching.

7. The UE system of claim 1, wherein to determine the modified candidate value, the processor is configured to: determine a time constant proportional to a candidate value at a subcarrier spacing below the mmWave frequency.

8. The UE system of claim 7, wherein to determine the modified candidate value, the processor is configured to: add a symbol to accommodate symbol-level beam switching.

9. The UE system of claim 7, wherein the modified candidate value is a function of the time constant proportional to the candidate value at the subcarrier spacing below the mmWave frequency.

10. The UE system of claim 1, wherein the beam switching parameter comprises maxNumberRxTxBeamSwitchDL, the determined modified candidate value comprises:

a maximum of one receive (Rx) transmit (Tx) switch per slot of the first CORESET;

a single Rx Tx switch over multiple slots of the first CORESET; or a minimum number of symbols within a slot of the first CORESET before a Rx Tx switch.

11. The UE system of claim 1, wherein the beam switching parameter comprises a tdd-MultiDL-UL-SwitchPerSlot, the determined modified candidate value comprises:

more than one switch point within X slots, where X is an integer, and wherein a minimum number of symbols occur between a switch point of the more than one switch point.

12. The UE system of claim 11, wherein to support the determined modified candidate value of the tdd-MultiDL-UL-SwitchPerSlot, a slot format indicator pattern comprises a flexible symbol between an uplink symbol and a downlink symbol.

13. The UE system of claim 1, wherein the BSG is greater than a time needed by the UE system to perform the beam switching.

14. A method for a user equipment (UE) system performing wireless communications at millimeter wavelength (mmWave) frequencies, comprising:

determining a modified candidate value of a beam switching parameter based at least on operations at an mmWave frequency of the mmWave frequencies; and transmitting the modified candidate value of the beam switching parameter to a base station (BS);

receiving a first control resource set (CORESET) on a first beam and a second CORESET on a second beam, wherein a beam switching gap (BSG) occurs between the first CORESET and the second CORESET; and performing beam switching within the BSG from the first beam to the second beam based at least on the beam switching parameter.

15. The method of claim 14, wherein a time to perform the beam switching within the BSG is greater than a length of a cyclic prefix (CP) of a symbol of the first CORESET, or the BSG is greater than a time needed by the UE system to perform the beam switching.

16. The method of claim 14, wherein the beam switching parameter is associated with a capability including: Aperiodic-Channel State Information-Reference Signal (A-CSI-RS) beam switching timing, Physical Downlink Shared Channel (PDSCH) beam switching, Physical Uplink Shared Channel (PUSCH) beam switching, a CSI computation delay requirement, beam reporting timing, beam switching, or more than one Downlink (DL)/Uplink (UL) switch point in a slot.

17. The method of claim 14, wherein the determining the modified candidate value comprises:

determining a time constant proportional to a candidate value at a subcarrier spacing below the mmWave frequency; and adding a symbol to accommodate symbol-level beam switching.

18. The method of claim 14, wherein the beam switching parameter comprises maxNumberRxTxBeamSwitchDL, the determined modified candidate value comprises:

a maximum of one receive (Rx) transmit (Tx) switch per slot of the first CORESET;

a single Rx Tx switch over multiple slots of the first CORESET; or a minimum number of symbols within a slot of the first CORESET before a Rx Tx switch.

19. The method of claim 14, wherein the beam switching parameter comprises a tdd-MultiDL-UL-SwitchPerSlot, the determined modified candidate value comprises:

more than one switch point within X slots, where X is an integer, and wherein a minimum number of symbols occur between a switch point of the more than one switch point.

20. A base station (BS) system comprising:

a transceiver configured to operate in millimeter wavelength (mmWave) frequencies; and a processor coupled to the transceiver, configured to:

receive via the transceiver, a beam switching gap (BSG) capability corresponding to a user equipment (UE) including a modified candidate value of a beam switching parameter based at least on operations at an mmWave frequency of the mmWave frequencies;

in response to the reception, transmit via the transceiver, a first transmission configuration indicator (TCI) state for the UE to receive a first beam; and transmit via the transceiver, a first control resource set (CORESET) on the first beam and a second CORESET on a second beam, wherein a BSG occurs between the first CORESET and the second CORESET, wherein the first CORESET identifies a second TCI state for the UE to receive the second beam.

* * * * *